C. McEWAN & C. O. GIBSON.
Milk-Cooler.
No. 160,273.  Patented March 2, 1875.
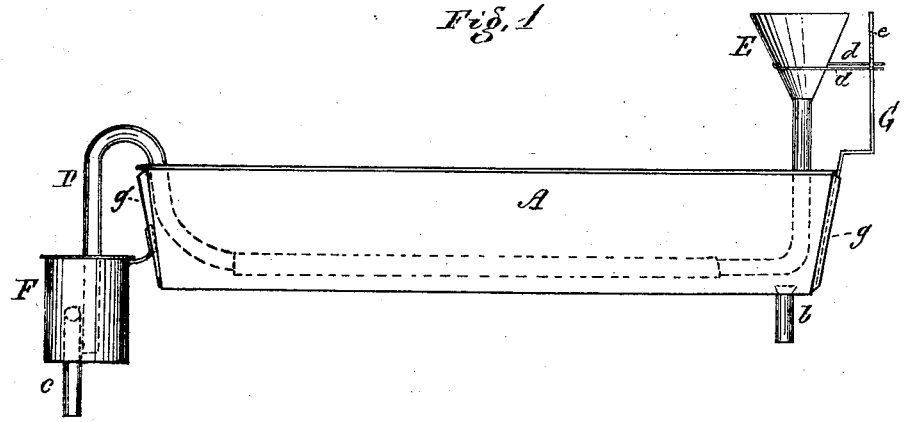
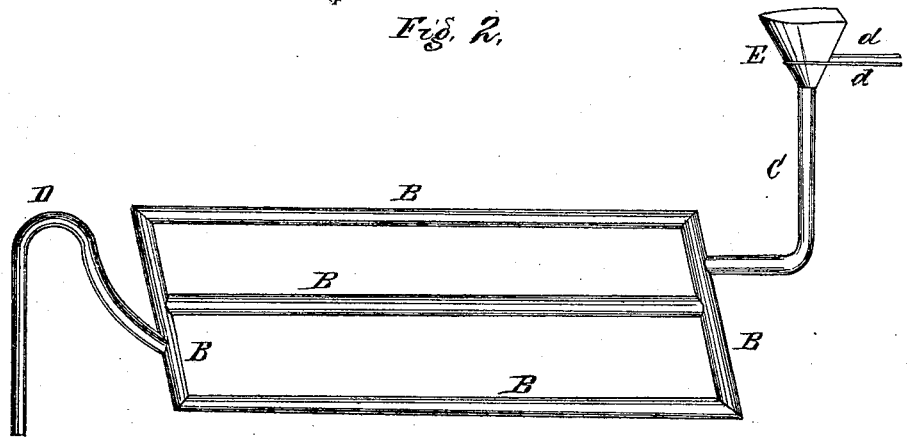
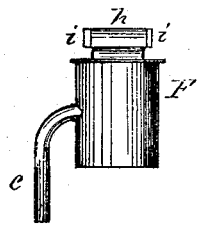
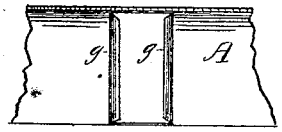
WITNESSES
Theron D. Fuller
Naz E. Oliphant
INVENTOR
George McEwan,
Charles O. Gibson.
By Charles H. Fowler
Attorney
THE GRAPHIC CO. PHOTO-LITH. 39 & 41 PARK PLACE, N.Y.

UNITED STATES PATENT OFFICE.

GEORGE McEWAN AND CHARLES O. GIBSON, OF DERBY LINE, VERMONT.

IMPROVEMENT IN MILK-COOLERS.

Specification forming part of Letters Patent No. 160,273, dated March 2, 1875; application filed February 12, 1875.

*To all whom it may concern:*

Be it known that we, GEORGE McEWAN and CHARLES O. GIBSON, both of Derby Line, in the county of Orleans and State of Vermont, have invented a new and valuable Improvement in Coolers for Milk-Pans; and we do hereby declare that the following is a full, clear, and exact description of the construction and operation of the same, reference being had to the annexed drawings, making a part of this specification, and to the letters and figures of reference marked thereon.

Figure 1 of the drawing is a representation of a perspective view of my invention. Fig. 2 is a detached view of the cooling or heating pipes. Fig. 3 is a detached view of siphon-cup; Fig. 4, a broken end view of the pan or vessel, showing the guide strips or flanges; Fig. 5, a detached view of the removable standard.

This invention has relation to means for cooling or heating milk or other liquids; and consists in providing the pipes through which the heating or cooling liquid passes with a siphon for drawing off the same. My invention also consists in the means, hereinafter described, of supporting the pipes in the pan or vessel to allow them at all times to be submerged in the liquid, so as to cool or heat the same in a uniform manner.

In the drawings, A represents the pan or other vessel, of any suitable form or shape, and of sufficient size to hold the milk obtained from one milking of a dairy of any number of cows. This pan or vessel is provided at its bottom with an outlet-tube, $b$, the opening of which may be controlled by a suitable faucet, plug, or stopper, for the purpose of drawing off the contents of the pan or vessel when desired. B B represent the pipes, of any suitable form, through which the cooling or heating liquid flows, and may be, if desired, arranged as shown in Fig. 2, to adapt them to pans or vessels of rectangular form; but this is not essential, as the shape of the pipes is to be determined by and adapted to the form of the pan. At one end of these pipes B is an induction-pipe, C, provided with a funnel end, E, to receive the cooling or heating liquid, and at the other end is an eduction or discharge tube, D, the lower part of the same forming a siphon. A cup, F, is provided with a discharge-nozzle, $c$, communicating with the said cup at a suitable distance from its bottom, by which sufficient liquid is left therein to close the mouth of the siphon-tube or eduction-pipe D, and preventing the air from getting into the pipes B, thereby drawing the liquid all out of the pipes as soon as the supply is stopped at the funnel end E. This funnel E has rigidly connected to it rods $d\ d$, which pass through openings $e$ in a standard, G, by which means the pipes B can be adjusted and supported in the pan or vessel, for the purpose of allowing them at all times to be submerged in the milk or other fluid, so as to cool or heat the same in a uniform manner. The standard G is of the form shown in Figs. 1 and 5, and is supported at the end of the vessel or pan A by guide strips or flanges $g\ g$, between which the tongue $f$ is inserted. The siphon-cup F is provided near its mouth with an outwardly-projecting flange, $h$, having ears $i\ i$, by which the cup may be held at any suitable distance from the end of the siphon or eduction tube C by the guide strips or flanges $g'\ g'$, and also admitting the removal of the cup from the pan or vessel when desired.

Having now fully described our invention, what we claim, and desire to secure by Letters Patent, is—

1. The combination, with the pan A, having at its end guide strips or flanges $g\ g$ and standard G, of the cooling or heating pipes B, provided with induction-tube C, funnel E, and rods $d\ d$, substantially as and for the purpose specified.

2. The combination of the pan or vessel A, having guide strips or flanges $g'\ g'$, and the cooling or heating pipes B, with siphon or eduction tube D of the cup F, provided with nozzle $c$, projecting flange $h$ and $i\ i$, substantially as and for the purpose set forth.

In testimony that we claim the above we have hereunto subscribed our names in the presence of two witnesses.

GEO. McEWAN.
CHARLES OAKLEY GIBSON.

Witnesses:
N. T. SHEAFE,
TIMOTHY HINMAN.